(12) United States Patent
Ariyoshi et al.

(10) Patent No.: US 12,515,960 B2
(45) Date of Patent: Jan. 6, 2026

(54) METHOD FOR PRODUCING LITHIUM HYDROXIDE

(71) Applicant: JX NIPPON MINING & METALS CORPORATION, Tokyo (JP)

(72) Inventors: Hirotaka Ariyoshi, Hitachi (JP); Isao Tomita, Hitachi (JP); Hiroshi Abe, Hitachi (JP)

(73) Assignee: JX METALS CIRCULAR SOLUTIONS CO., LTD., Tokyo (JP)

( * ) Notice: Subject to any disclaimer, the term of this patent is extended or adjusted under 35 U.S.C. 154(b) by 638 days.

(21) Appl. No.: 17/918,787

(22) PCT Filed: Apr. 21, 2021

(86) PCT No.: PCT/JP2021/016223
§ 371 (c)(1),
(2) Date: Oct. 13, 2022

(87) PCT Pub. No.: WO2021/215486
PCT Pub. Date: Oct. 28, 2021

(65) Prior Publication Data
US 2023/0132311 A1 Apr. 27, 2023

(30) Foreign Application Priority Data

Apr. 21, 2020 (JP) ................................. 2020-075634
Apr. 21, 2020 (JP) ................................. 2020-075635

(51) Int. Cl.
*C01D 15/02* (2006.01)
*B09B 3/35* (2022.01)
*B09B 3/70* (2022.01)

(52) U.S. Cl.
CPC ................ *C01D 15/02* (2013.01); *B09B 3/35* (2022.01); *B09B 3/70* (2022.01)

(58) Field of Classification Search
CPC .............. C01D 15/02; B09B 3/35; B09B 3/70
(Continued)

(56) References Cited

U.S. PATENT DOCUMENTS 4,154,801 A * 5/1979 Wheaton .................. B01J 43/00
423/181
9,677,181 B2 * 6/2017 Bourassa .................. C25B 1/16
(Continued)

FOREIGN PATENT DOCUMENTS

CN 107128954 A 9/2017
CN 107285345 A 10/2017
(Continued)

OTHER PUBLICATIONS

Extended European Search Report for European Application No. 21792875.3, dated Apr. 17, 2024.
(Continued)

*Primary Examiner* — Cam N. Nguyen
(74) *Attorney, Agent, or Firm* — Birch, Stewart, Kolasch & Birch, LLP

(57) ABSTRACT

Provided is a method for producing lithium hydroxide, which can obtain lithium hydroxide from lithium sulfate with a relatively low cost. A method for producing lithium hydroxide from lithium sulfate includes: a hydroxylation step of allowing the lithium sulfate to react with barium hydroxide in a liquid to provide a lithium hydroxide solution; a barium removal step of removing barium ions in the lithium hydroxide solution using a cation exchange resin and/or a chelate resin; and a crystallization step of precipitating lithium hydroxide in the lithium hydroxide solution that has undergone the barium removal step.

16 Claims, 7 Drawing Sheets

(58) Field of Classification Search
USPC .......................................................... 423/642
See application file for complete search history.

(56) References Cited

U.S. PATENT DOCUMENTS

| | | | | |
|---|---|---|---|---|
| 10,329,160 | B2* | 6/2019 | Malhotra | ................. B01J 41/12 |
| 10,584,037 | B2* | 3/2020 | Malhotra | ................. B01J 49/60 |
| 10,633,748 | B2* | 4/2020 | Bourassa | ................ C01D 15/02 |
| 10,648,090 | B2* | 5/2020 | Snydacker | ............ B01D 61/58 |
| 11,292,725 | B2* | 4/2022 | Tiihonen | ................... C22B 3/12 |
| 2011/0044882 | A1* | 2/2011 | Buckley | ................. C01D 15/02 |
| | | | | 423/481 |
| 2011/0135547 | A1 | 6/2011 | Kobayashi et al. | |
| 2019/0152797 | A1 | 5/2019 | Liu et al. | |
| 2020/0248283 | A1 | 8/2020 | Ariyoshi et al. | |
| 2021/0316998 | A1 | 10/2021 | Ariyoshi et al. | |
| 2022/0064757 | A1* | 3/2022 | Ghahreman | ............ C01F 11/46 |
| 2023/0019776 | A1* | 1/2023 | Bishkin | ................... B01J 47/10 |

FOREIGN PATENT DOCUMENTS

| | | |
|---|---|---|
| CN | 108658099 A | 10/2018 |
| CN | 109987616 A | 7/2019 |
| CN | 110791664 A | 2/2020 |
| JP | 62-161973 A | 7/1987 |
| JP | 2009-46390 A | 3/2009 |
| JP | 2009-269810 A | 11/2009 |
| JP | 2009-270188 A | 11/2009 |
| JP | 2010-180439 A | 8/2010 |
| JP | 2011-31232 A | 2/2011 |
| JP | 2011-32151 A | 2/2011 |
| JP | 2014-162982 A | 9/2014 |
| JP | 2019-26531 A | 2/2019 |
| JP | 2019-26916 A | 2/2019 |
| JP | 2019-99901 A | 6/2019 |
| JP | 2019-178395 A | 10/2019 |
| JP | 2019-530795 A | 10/2019 |
| JP | 2020-35723 A | 3/2020 |
| JP | 2020-164969 A | 10/2020 |
| KR | 10-2016-0002578 A | 1/2016 |
| KR | 10-1975468 B1 | 1/2016 |

OTHER PUBLICATIONS

Office Action for corresponding Japanese Application No. 2020-075634, dated Feb. 14, 2023, including an English translation.
International Preliminary Report on Patentability, dated Nov. 3, 2022, and English translation of the Written Opinion of the International Searching Authority, dated Jun. 22, 2021, for International Application No. PCT/JP2021/016223.
International Search Report for PCT/JP2021/016223 mailed on Jun. 22, 2021.

* cited by examiner

METHOD FOR PRODUCING LITHIUM HYDROXIDE

CROSS-REFERENCE TO RELATED APPLICATIONS

This application is the National Phase of PCT International Application No. PCT/JP2021/016223, filed on Apr. 21, 2021, which claims priority under 35 U.S.C. § 119(a) to Patent Application Nos. 2020-075634 and 2020-075635, both of which were filed in Japan on Apr. 21, 2020, all of which are hereby expressly incorporated by reference into the present application.

FIELD OF THE INVENTION

This specification discloses a technique relating to a method for producing lithium hydroxide.

BACKGROUND OF THE INVENTION

Lithium sulfate in a form of liquid or solid, and lithium carbonate may be obtained by, for example, a process of recovering valuable metals from lithium ion secondary battery waste or various electronic devices, a process of salt water of salt lake or ore, or other processes.

For example, in an example of processes for lithium ion secondary battery waste, it is subjected to a process such as roasting, and a lithium dissolved solution in which lithium contained in the waste is dissolved is then obtained. The lithium dissolved solution may be a lithium hydrogen carbonate solution, from which lithium carbonate is obtained. Techniques relating to this include, for example, those described in Patent Literatures 1 and 2, and the like. Further, the lithium dissolved solution may be subjected to extraction of lithium ions with a solvent and back extraction from the solvent to an aqueous phase to be concentrated, and the resulting back-extracted solution after the extraction and back extraction may be a lithium sulfate solution. Such extraction and back extraction are described in Patent Literatures 3 to 5, and the like.

The back-extracted solution obtained after the above back extraction is generally carbonated by addition of a carbonate or blowing of a carbon dioxide gas, as described in Patent Literature 5. In this case, lithium is recovered as lithium carbonate.

Patent Literatures 6 and 7 describe a method for producing lithium hydroxide, which can be used as a raw material for a cathode material of a lithium ion secondary battery, from lithium carbonate.

More particularly, Patent Literature 6 discloses "a method for producing lithium hydroxide, comprising, in an electrolytic apparatus composed of an anode tank, a cathode tank, and a cation exchange membrane, feeding an aqueous lithium carbonate solution or suspension to the anode tank and carrying out electrolysis, and producing an aqueous solution of lithium hydroxide in the cathode tank through the cation exchange membrane".

Moreover, Patent Literature 7 discloses "a method for producing lithium hydroxide, characterized by using an electrodialysis device in which cation exchange membranes and anion exchange membrane are alternately arranged between an anode and a cathode, and at least one set of an acid chamber, a salt chamber, an alkali chamber and a water electrolysis chamber in this order is arranged, wherein the anode chamber is formed by the anode and the cation exchange membrane, and then the acid chamber is partitioned by the cation exchange member and the anion exchange member is formed from the anode side to the cathode side, and then the salt chamber is partitioned by the anion exchange membrane and the other cation exchange membrane, and then alkali chamber is partitioned by that cation exchange membrane and the other anion exchange membrane, and then the water electrolysis chamber is partitioned by that anion exchange membrane and the other cation exchange membrane, wherein the water electrolysis chamber composed of the anion membrane closest to the cathode is partitioned by a cathode instead of the cation membrane to form a cathode chamber, wherein the method comprises feeding an aqueous lithium salt solution to the salt chamber and removing an acid from the acid chamber and an aqueous lithium hydroxide solution from the alkali chamber".

Both of Patent Literatures 6 and 7 use lithium carbonate as a raw material, and produce lithium hydroxide from the lithium carbonate using electrolysis.

CITATION LIST

Patent Literatures

[Patent Literature 1] Japanese Patent Application Publication No. 2019-26916 A
[Patent Literature 2] Japanese Patent Application Publication No. 2019-26531 A
[Patent Literature 3] Japanese Patent Application Publication No. 2010-180439 A
[Patent Literature 4] U.S. Patent Application Publication No. 2011/0135547 A1
[Patent Literature 5] Japanese Patent Application Publication No. 2014-162982 A
[Patent Literature 6] Japanese Patent Application Publication No. 2009-270188 A
[Patent Literature 7] Japanese Patent Application Publication No. 2011-31232 A

SUMMARY OF THE INVENTION

Technical Problem

If the techniques described in Patent Literatures 6 and 7 try to be applied in order to produce lithium hydroxide from lithium sulfate as described above, it will be necessary to first convert lithium sulfate into lithium carbonate, and then implement electrolysis, so that the number of steps is increased, as well as costs are significantly increased due to the implementation of electrolysis. Moreover, if the techniques described in Patent Literatures 6 and 7 are used in order to produce lithium hydroxide from lithium carbonate, the cost will be significantly increased due to the implementation of electrolysis.

In particular, this specification discloses a method for producing lithium hydroxide, which can obtain lithium hydroxide from lithium sulfate or lithium carbonate with a relatively low cost.

Solution to Problem

One method for producing lithium hydroxide disclosed in this specification is a method for producing lithium hydroxide from lithium sulfate, the method comprising: a hydroxylation step of allowing the lithium sulfate to react with barium hydroxide in a liquid to provide a lithium hydroxide solution; a barium removal step of removing barium ions in the lithium hydroxide solution using a cation exchange resin and/or a chelate resin; and a crystallization step of precipitating lithium hydroxide in the lithium hydroxide solution that has undergone the barium removal step.

Other method for producing lithium hydroxide disclosed in this specification is a method for producing lithium hydroxide from lithium carbonate, the method comprising: a hydroxylation step of allowing the lithium carbonate to react with calcium hydroxide in a liquid to provide a lithium hydroxide solution; a calcium removal step of removing calcium ions in the lithium hydroxide solution using a cation exchange resin and/or a chelate resin; and a crystallization step of precipitating lithium hydroxide in the lithium hydroxide solution that has undergone the calcium removal step.

Advantageous Effects of Invention

According to the methods for producing lithium hydroxide, lithium hydroxide can be obtained from lithium sulfate or lithium carbonate with a relatively low cost.

DETAILED DESCRIPTION OF THE INVENTION

Hereinafter, embodiments disclosed in this specification will be described in detail.
<Method for Producing Lithium Hydroxide from Lithium Sulfate>

Figure 1:
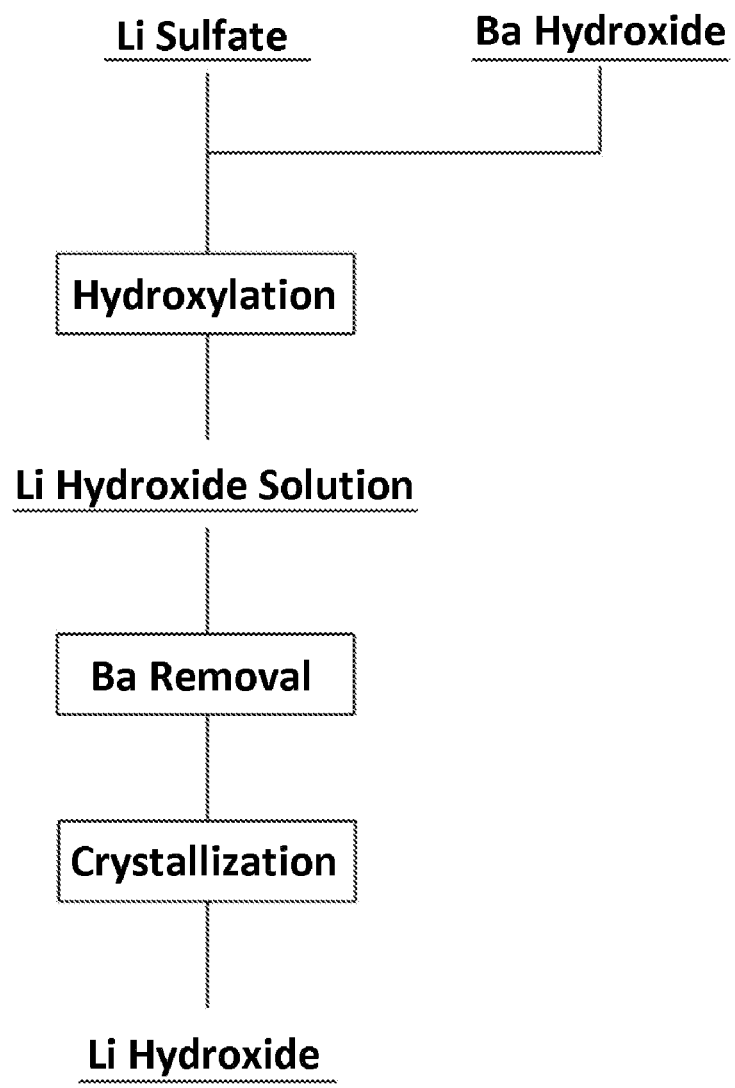
FIG. 1 is a flow chart showing a method for producing lithium hydroxide according to one embodiment.

One method for producing lithium hydroxide disclosed in this specification is a method for producing lithium hydroxide from lithium sulfate, the method including: a hydroxylation step of allowing the lithium sulfate to react with barium hydroxide in a liquid to provide a lithium hydroxide solution; a barium removal step of removing barium ions in the lithium hydroxide solution using a cation exchange resin and/or a chelate resin; and a crystallization step of precipitating lithium hydroxide in the lithium hydroxide solution that has undergone the barium removal step, for example, as shown in FIG. 1.

Lithium hydroxide has a lower melting point than that of lithium carbonate, so that it may be effectively used as a raw material for cathode materials of lithium ion secondary batteries. Therefore, in this embodiment, lithium hydroxide, rather than lithium carbonate, is easily produced from lithium sulfate with a lower cost. In particular, an object of the present invention herein is to sufficiently reduce impurities in lithium hydroxide to be produced, and to produce lithium hydroxide having a high purity sufficient to be suitably used as a raw material for the cathode material.

Here, lithium hydroxide can be relatively easily obtained by the hydroxylation step of allowing lithium sulfate to react with barium hydroxide based on the formula: $Li_2SO_4+Ba(OH)_2 \rightarrow 2LiOH+BaSO_4$. After the reaction, barium sulfate produced by the reaction can be removed to some extent by solid-liquid separation.

However, it is unavoidable that barium ions remain in the lithium hydroxide solution, and even if it is crystallized as it is, the purity of lithium hydroxide is lowered due to the presence of the barium.

Therefore, after the hydroxylation step, this embodiment carries out the barium removal step of absorbing and removing the barium ions present in the lithium hydroxide solution due to the addition of barium hydroxide in the hydroxylation step with a cation exchange resin and/or a chelate resin, and then carries out the crystallization step. This can provide high-purity lithium hydroxide having a lower barium content.

(Lithium Sulfate)

Lithium sulfate, which is used as a raw material for producing lithium hydroxide, can be obtained, for example, by a process of recovering valuable metals from lithium ion secondary battery waste.

The lithium ion secondary battery has a housing containing aluminum as an exterior wrapping around the battery. Examples of the housing include those made only of aluminum, those containing aluminum and iron, aluminum laminates, and the like. Further, the lithium ion secondary battery may contain, in the housing, a cathode active material layer made of an oxide of an elemental metal selected from the group consisting of lithium, nickel, cobalt and manganese, and/or a composite metal oxide of two or more metals and the like, and/or aluminum foils (cathode substrate) to which the cathode active materials are applied and fixed by, for example, polyvinylidene fluoride (PVDF) or other organic binder. In addition, the lithium ion batteries may contain copper, iron, or the like. Further, the lithium ion secondary battery generally contains an electrolytic solution in the housing. For example, ethylene carbonate, diethyl carbonate or the like may be used as the electrolytic solution.

Examples of lithium sulfate obtained from such lithium ion secondary battery waste are shown below.
(Lithium Dissolution Step)

Figure 2:
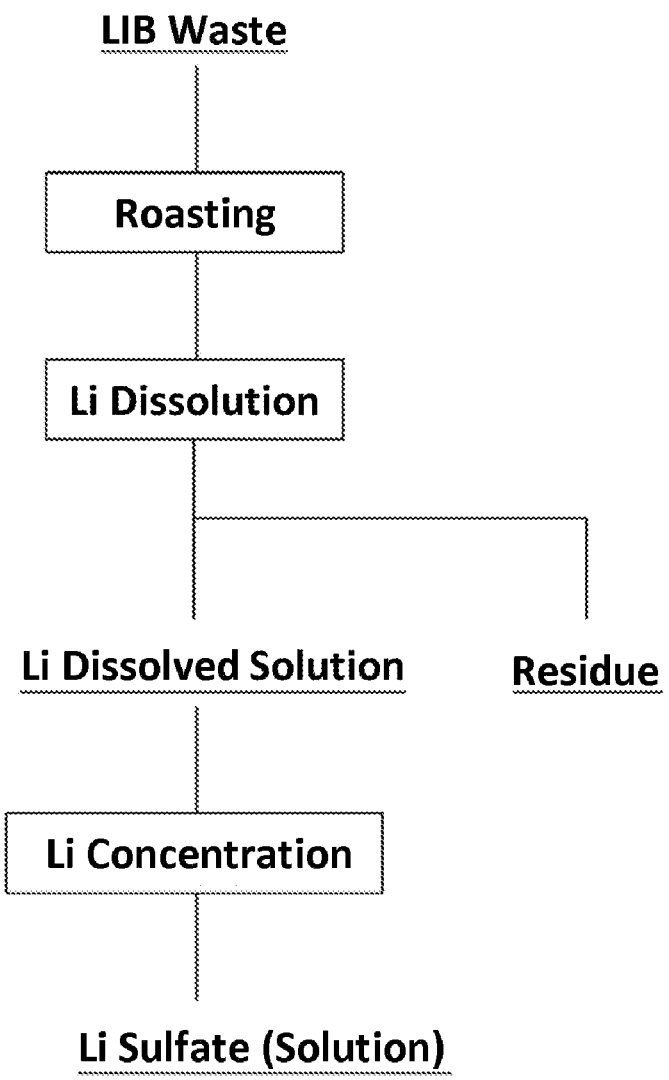
FIG. 2 is a flow chart showing an example of a process for obtaining lithium sulfate that can be used in the method for producing lithium hydroxide of FIG. 1.

As illustrated in FIG. 2, the lithium ion secondary battery waste is processed by roasting, crushing, sieving, and the like as needed, and a lithium dissolution step of dissolving the lithium contained therein in water or an acidic solution is then carried out to obtain a solution containing lithium (which is, hereinafter, referred to as a lithium dissolved solution). In the lithium dissolution step, the solution becomes alkaline as lithium is dissolved, so that the pH may be adjusted as needed such that the final pH of the lithium dissolved solution is 7 to 10. This is because, in this case, the pH of 7 to 10 can suppress the elution of cobalt, nickel, aluminum, and the like, and selectively dissolve mainly lithium. The lithium dissolved solution obtained by processing the lithium ion secondary battery waste by roasting and the like and then dissolving it in water or an acidic solution contains less impurities and is suitable as a raw material for lithium hydroxide, which will be described below. It should be noted that the residue generated in the lithium dissolution step can be used in the recovery process of valuable metals such as cobalt and nickel by acid leaching, neutralization, solvent extraction, and the like.

Alternatively, the lithium dissolved solution may be a solution in which valuable metals such as cobalt, nickel, and manganese are recovered to leave lithium, while leaching all elements and removing impurities without previously recovering lithium from the sieved material obtained by the step of roasting, crushing, and sieving the lithium ion battery waste.

(Lithium Concentration Step)

Next, as shown in FIG. 2, a lithium concentration step of extracting the lithium ions in the lithium dissolved solution with a solvent and back-extracting the lithium ions in the solvent is carried out to concentrate the lithium ions and obtain a lithium sulfate solution. Here, in the lithium concentration step, the solvent after extracting the lithium ions can be scrubbed with a lithium solution containing lithium ions. In this case, the back extraction is carried out on the scrubbed solvent.

As will be described later, sodium hydroxide is often used as a pH adjusting agent during the extraction, and in this case, the solvent after extraction will contain sodium ions in addition to the lithium ions. Therefore, it is preferable to carrying out the scrubbing between the extraction and the back extraction, because the scrubbing of the solvent with the lithium solution is effective for removing the sodium ions extracted into the solvent.

The lithium sulfate solution obtained in the lithium concentration step can be used as lithium sulfate in the embodiment shown in FIG. 1.

Specifically, the extraction is carried out, for example, by bring the lithium dissolved solution (aqueous phase) into contact with the solvent (organic phase), mixing them with stirring by means of a mixer, and transferring lithium ions and the like in the lithium dissolved solution to the solvent. Subsequently, the organic phase and the aqueous phase are separated by a settler based on the difference in specific gravity. An O/A ratio, which is a volume ratio of the organic phase to the aqueous phase, can be higher than 1.5/1.0, depending on the lithium ion concentration or other conditions. In order to increase an extraction rate of lithium ions, the O/A ratio can be adjusted and the number of extraction stages can be increased.

Here, for the lithium dissolved solution, a phosphonate ester extracting agent can be used alone, a phosphate ester extracting agent can be used alone, or mixed extracting agents of a phosphonate ester extracting agent and a phosphate ester extracting agent can be used. As the phosphonate extracting agent, 2-ethylhexyl 2-ethylhexylphosphonate (trade name: PC-88A, Ionquest 801) is preferable from the viewpoint of separation efficiency between nickel and cobalt. Examples of the phosphate extracting agent include di-2-ethylhexyl phosphate (trade name: D2EHPA or DP8R).

The extracting agent may optionally be diluted with a hydrocarbon organic solvent such as aromatic, paraffinic, and naphthenic solvents, before use. In this case, the concentration of the extracting agent can be, for example, 15% to 35% by volume.

The equilibrium pH during extraction is preferably 7 to 8. This is because if the equilibrium pH is less than 7, the lithium extraction rate may be lower and phase separation may be poor, and whereas if the equilibrium pH is more than 8, a concentration of an alkali derived from the pH adjusting agent is increased, so that the extracting agent and diluent may be separated. From the point of view, the equilibrium pH during extraction is preferably 7.2 to 7.5. The term "equilibrium pH" as used herein refers to a pH of a liquid aqueous phase when the liquid aqueous phase and the oil phase are separated by leaving to stand after the solvent extraction operation, scrubbing operation, and back-extraction operation.

To adjust the pH during extraction, a pH adjusting agent such as sodium hydroxide, lithium hydroxide, aqueous ammonia and other alkaline solutions can be used. Among them, sodium hydroxide is preferred because it is less expensive than other reagents and has no odor. Moreover, even if sodium hydroxide is added as a pH adjusting agent, the resulting sodium ions can be effectively removed by scrubbing, which will be described later in detail, so that an increase in sodium that becomes impurities can be suppressed.

The scrubbing of the solvent with the lithium solution is effective for removing sodium ions extracted into the solvent. By adjusting the lithium ion concentration in the lithium solution or the like, the lithium ions in the lithium solution are substituted with the sodium ions in the solvent, so that the sodium ions in the solvent can be effectively removed. At this time, the lithium ions and the sodium ions are generally substituted in the same number of moles as each other. Therefore, if the number of moles of lithium ions in the lithium solution is equal to or higher than the number of moles of sodium ions in the solvent, the sodium ions in the solvent can be more effectively removed.

The lithium ion concentration in the lithium solution used for scrubbing is preferably 1.0 g/L to 10.0 g/L, and more preferably 1.0 g/L to 5.0 g/L.

During the scrubbing, the pH of the mixture of the solvent and the lithium solution is preferably adjusted to 5.0 to 9.0, and the pH is more preferably adjusted to 6.0 to 8.0.

By undergoing the scrubbing step, the sodium ion concentration in the solvent can be preferably reduced to 1 mg/L or less.

The lithium ions contained in the scrubbed solvent are then back-extracted from the scrubbed solvent. In the back extraction, for example, stirring and mixing are carried out by a mixer or the like using a pre-back extraction liquid, which is an acidic aqueous solution. This can allow the lithium ions contained in the solvent to be transferred to the aqueous phase.

The pre-back extraction solution used for back extraction may be any of inorganic acids such as sulfuric acid, hydrochloric acid, and nitric acid. Among them, sulfuric acid is preferred, because, by using sulfuric acid, the back-extracted liquid becomes a lithium sulfate liquid, which can be used as a raw material for lithium hydroxide.

The back extraction maintains a pH such that the equilibrium pH is preferably in the range of 0.5 to 2.0, and more preferably in the range of 1.0 to 1.5. If the equilibrium pH during the back extraction deviates from the range to decrease, the amount of the pH adjusting agent during the extraction may increase. Moreover, if the equilibrium pH exceeds the range, there is concern that lithium ions may remain in the solvent. If the back extraction is carried out in multiple stages, the pH may increase as the number of stages is increased. In this case, it is preferable to be controlled such that the equilibrium pH is maintained in the above range such as by adding sulfuric acid, for example.

Although other conditions are appropriately set, the O/A ratio can be, for example, 1.0 or more, and preferably 1.0 to 1.5.

The back-extracted liquid obtained in the back extraction step can be further subjected to the back extraction step as a pre-back extraction liquid, thereby further increasing the lithium ion concentration. Further, the back-extracted liquid can also be used in the scrubbing step as a lithium solution.

The back-extracted liquid (lithium sulfate solution) has a lithium ion concentration of, for example, 10 g/L to 30 g/L, typically 20 g/L to 25 g/L. Also, the sodium ion concentration in the back-extracted liquid is preferably 3 mg/L or less, and more preferably 1 mg/L or less.

In particular, the lithium ion concentration in the lithium sulfate solution obtained from the lithium ion secondary battery waste as described above is, for example, 10.0 g/L to 30.0 g/L, and typically 20.0 g/L to 25.0 g/L. The sodium ion concentration in the lithium sulfate solution is, for example, less than 10.0 mg/L, and typically 3.0 mg/L or less, and more typically 1.0 mg/L or less. Impurities other than sodium, such as potassium, calcium, iron, copper, zinc, aluminum, nickel, cobalt, and manganese, are maintained at lower levels even before solvent extraction. On the other hand, impurities such as phosphorus and chlorine are removed prior to solvent extraction, resulting in lower concentrations.

However, it can be applied not only to the process of recovering valuable metals from lithium ion secondary battery waste but also to various processes for obtaining liquid or solid lithium sulfate.

(Hydroxylation Step)

In the hydroxylation step, lithium sulfate as the above back-extracted liquid or the like is allowed to react with barium hydroxide in the liquid to obtain a lithium hydroxide solution. The reaction herein can be expressed as: $Li_2SO_4 + Ba(OH)_2 \rightarrow 2LiOH + BaSO_4$. Accordingly, a lithium hydroxide solution in which lithium hydroxide is dissolved is produced, and barium sulfate is precipitated. The use of barium hydroxide is effective in that a lithium hydroxide solution can be produced by a chemical conversion reaction with lithium sulfate.

Figure 6:
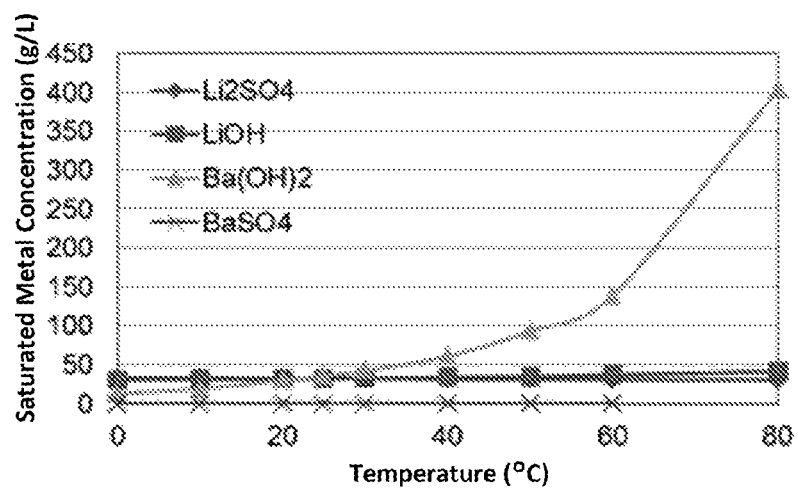
FIG. 6 is a graph showing temperature dependency of a metal concentration on saturation dissolution of a compound of each metal.

More particularly, for the lithium sulfate solution, barium hydroxide is added to the lithium sulfate solution and allowed to react in the liquid. Alternatively, for solid lithium sulfate, the lithium sulfate and barium hydroxide are added to a liquid such as water to form a slurry and cause the reaction to occur. Although barium hydroxide may be added in a solid state, barium hydroxide can be added in a liquid state as a barium hydroxide solution, thereby improving an efficiency of the reaction. In particular, as shown in FIG. 6, the saturated solubility of barium hydroxide increases between 40° C. and 100° C. Therefore, it is more preferable to bring a barium hydroxide solution between 40° C. and 100° C. into contact with lithium sulfate and allow to react with each other. Preferably, the barium hydroxide solution is a saturated aqueous solution.

The barium hydroxide is preferably added in the molar equivalent of lithium hydroxide in the above reaction formula, and 1.05 times to 1.70 times the equivalent of the total of lithium ions and free sulfate ions when the sulfate ions are excessive. Such addition of excessive barium hydroxide to a certain degree can allow sulfate ions to be removed. Even if a relatively large amount of barium hydroxide is added, the barium ions can be effectively removed in a barium removal step as described later. If the amount of barium hydroxide added is too low, unreacted lithium sulfate may be precipitated during crystallization, so that the amount of lithium hydroxide recovered may be decreased. Moreover, when the sulfate ions are excessive, the sulfate ions may remain as impurities during crystallization. On the other hand, if the amount of barium hydroxide added is excessive, the amount of barium hydroxide that does not contribute to the reaction increases. Since barium hydroxide that does not contribute to the reaction becomes an impurity during crystallization, the burden of the barium removal step increases, which may increase the total cost.

In addition, the free sulfate ions as described above means a difference between sulfate ions and lithium ions when the amount of the sulfate ions is higher than that of the lithium ions. Therefore, the total equivalent of the lithium ions and the free sulfate ions has the same meaning as the equivalent of the lithium ions when the amount of the lithium ions is higher than that of the sulfate ions, and the equivalent of the sulfate ions when the amount of the sulfate ions is higher than that of the lithium ions.

In the reaction of lithium sulfate with barium hydroxide, the pH of the liquid may be 9 or more. The upper limit is not particularly defined, but if the pH is more than 12, it merely becomes excessive. Therefore, a pH of 12 or less is preferable. A lower pH may result in insufficient reaction of lithium sulfate with lithium hydroxide, while a higher pH may increase chemical costs and costs for removal, because of excess barium hydroxide.

Most of the barium sulfate produced in the above reaction can be removed by solid-liquid separation using a thickener, filter press, or the like after the reaction. That is, most of the barium sulfate can be separated from the lithium hydroxide solution by solid-liquid separation after the reaction.

However, even if solid-liquid separation is carried out, barium may remain dissolved in the lithium hydroxide solution. Barium ions contained in the lithium hydroxide solution will degrade lithium hydroxide after crystallization. Therefore, in this embodiment, the barium ions are removed by carrying out the following barium removal step.

(Barium Removal Step)

In the barium removal step, to remove the barium ions in the lithium hydroxide solution obtained in the hydroxylation step, the lithium hydroxide solution is brought into contact with a cation exchange resin and/or a chelate resin to remove the impurities. More particularly, the lithium hydroxide solution is passed through the resin. Accordingly, the barium ions that may be contained in the lithium hydroxide solution are adsorbed to the resin, so that barium can be removed from the lithium hydroxide solution. As a result, lithium hydroxide having high purity can be obtained after a crystallization step as described below.

Here, it is important to select the resin and conditions in the barium removal step so that the barium ions in the lithium hydroxide solution are efficiently removed.

The resin for removing the barium ions and the like is at least one of the cation exchange resin and the chelate resin. It should be noted that the lithium hydroxide solution may be brought into contact with one of the cation exchange resin or the chelate resin, and then brought into contact with the other. In other words, the resin adsorption process may be carried out in multiple stages.

The cation exchange resin refers to a synthetic resin that binds cations by having acidic groups on its surface. The chelating resin refers to a resin having functional groups that form complexes with metal ions. Since the lithium hydroxide solution contains lithium ions and the like in addition to the barium ions, it is desirable to use the cation exchange resin and/or the chelate resin having a higher difference in selectivity with respect to the lithium ions in the impurity removal step.

When the cation exchange resin is used, the cationic exchange resin preferably employs a weakly acidic cation exchange resin having carboxyl groups as functional groups. A strongly acidic cation exchange resin has a lower difference in selectivity between monovalent metals and divalent metals, so that the divalent metals may leak at a relatively early stage of liquid passage. On the other hand, the weakly acidic cation exchange resin adsorbs a metal so as to sandwich it between two carboxyl groups, so that it has higher selectivity for the divalent metals. In particular, a weakly acidic cation exchange resin having a high ion exchange capacity and excellent physical strength is suitable.

The chelate resin has high selectivity for specific metals due to the chelate effect of ion exchanging and coordination bonding of functional groups. In particular, the chelate resin can be effectively used in a lithium hydroxide solution in which lithium ions and the like also coexist. The chelate resin includes iminodiacetic acid type and aminophosphoric acid type resins. Among them, the aminophosphoric acid type chelate resin is preferable in that it has higher selectivity of barium or the like for the monovalent ions than the other chelate resins.

When a column is filled with the cation exchange resin or the chelate resin and the lithium hydroxide solution is passed through the column, a space velocity (SV) in the column is preferably in the range of 5 to 20. The space velocity (SV) means a ratio (multiples) of a passed amount of the lithium hydroxide solution per hour to the cation exchange resin or the chelate resin filled in the column. In general, if the space velocity (SV) is too high, the barium ions in the lithium hydroxide solution may not be sufficiently removed due to insufficient adsorption time of the barium ions to the resin. If the spatial velocity (SV) is too slow, the processing rate will decrease and the processing time will increase.

When the lithium hydroxide solution is brought into contact with the cation exchange resin and/or the chelate resin, the pH of the lithium hydroxide solution is preferably 9 or more, that is, the lithium hydroxide solution is preferably alkaline. This is because if the pH of the lithium hydroxide solution is less than 9, the efficiency of removing the barium ions may decrease, or lithium ions may also be adsorbed, depending on the resin used. The pH of the lithium hydroxide solution in contact with the resin may vary depending on the type of the resin selected.

(Crystallization Step)

The crystallization step precipitates lithium hydroxide in the lithium hydroxide solution from which impurities have been removed in the barium removal step. Thus, lithium hydroxide can be obtained.

In the crystallization step, a crystallization operation such as heat concentration or vacuum distillation can be carried out in order to precipitate lithium hydroxide. For the heat concentration, the higher the temperature during crystallization, the faster the treatment, which is preferable. However, after crystallization, it is preferable to dry the crystallized product at a temperature of less than 60° C. at which water of crystallization is not released. This is because if the water of crystallization is released, it becomes anhydrous lithium hydroxide, which is deliquescent and difficult to be handled.

Subsequently, a pulverization treatment or the like can be carried out in order to adjust the lithium hydroxide to have required physical properties.

The lithium hydroxide thus obtained has a sufficiently reduced barium content of, for example, 10 ppm by mass or less, due to the barium removal step as described above. Such high-purity lithium hydroxide is suitable for use as a raw material for manufacturing lithium ion secondary batteries.

<Method for Producing Lithium Hydroxide from Lithium Carbonate>

Figure 3:
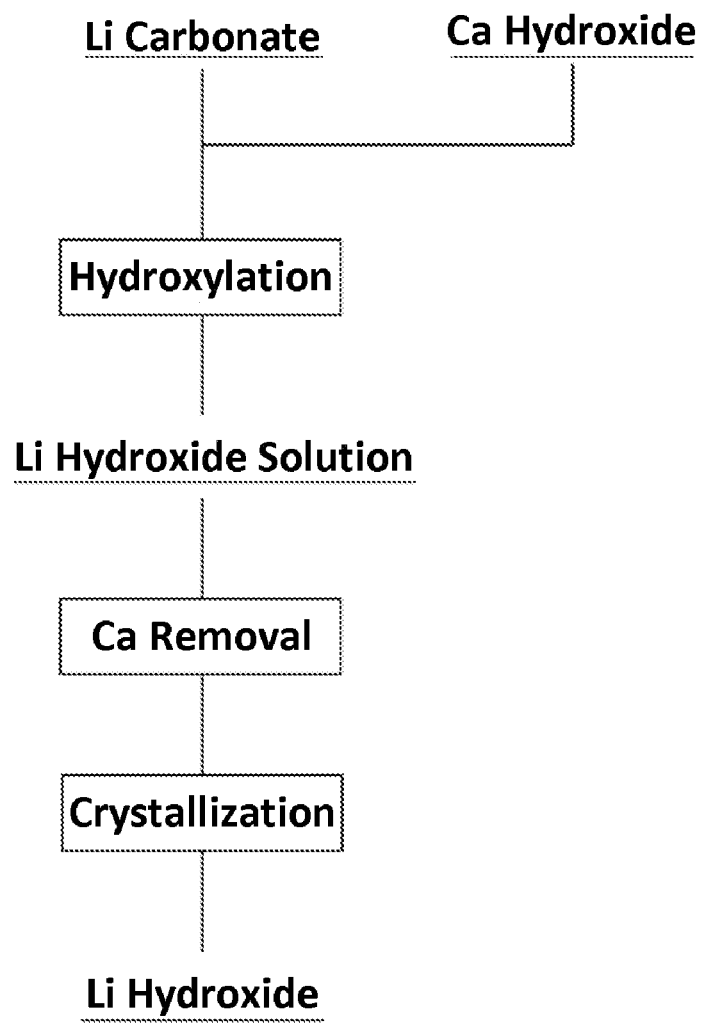
FIG. 3 is a flow chart showing a method for producing lithium hydroxide according to one embodiment.

A method for producing lithium hydroxide according to an embodiment is a method for producing lithium hydroxide from lithium carbonate, the method including, as shown in FIG. 3, a hydroxylation step of allowing the lithium carbonate to react with calcium hydroxide in a liquid to provide a lithium hydroxide solution; a calcium removal step of removing calcium ions in the lithium hydroxide solution using a cation exchange resin and/or a chelate resin; and a crystallization step of precipitating lithium hydroxide in the lithium hydroxide solution that has undergone the calcium removal step.

Lithium hydroxide has a lower melting point than lithium carbonate, and may be effectively used as a raw material for cathode materials of lithium ion secondary batteries. Therefore, in this embodiment, lithium hydroxide is easily produced at low cost from lithium carbonate. In particular, it is an object herein to sufficiently reduce impurities in the lithium hydroxide to be produced, and to produce lithium hydroxide having a high purity sufficient to be suitably used as a raw material for the cathode materials.

Here, lithium hydroxide can relatively easily be obtained by the hydroxylation step of allowing lithium carbonate to react with calcium hydroxide based on the formula: $Li_2CO_3+Ca(OH)_2 \rightarrow 2LiOH+CaCO_3$. After the reaction, a certain amount of calcium carbonate produced by the reaction can be removed by solid-liquid separation.

However, it is unavoidable that calcium ions remain in the lithium hydroxide solution, and even if they are crystallized as they are, the purity of lithium hydroxide will be decreased due to the presence of the calcium.

Therefore, in this embodiment, after the hydroxylation step, the calcium removal step is carried out to absorb the calcium ions present in the lithium hydroxide solution due to the addition of calcium hydroxide in the hydroxylation step to the cation exchange resin and/or the chelate resin and remove them, and the crystallization step is then carried out. As a result, high-purity lithium hydroxide having a lower calcium content is obtained.

(Lithium Carbonate)

Lithium carbonate, which is used as a raw material for producing lithium hydroxide, can be obtained, for example, by a process of recovering valuable metals from lithium ion secondary battery waste.

The lithium ion secondary battery has a housing containing aluminum as an exterior wrapping around the battery. Examples of the housing include those made only of aluminum, those containing aluminum and iron, aluminum laminates, and the like. Further, the lithium ion secondary battery may contain, in the housing, a cathode active material layer made of an oxide of an elemental metal selected from the group consisting of lithium, nickel, cobalt and manganese, or a composite metal oxide of two or more metals and the like, and/or aluminum foils (cathode substrate) to which the cathode active materials are applied and fixed by, for example, polyvinylidene fluoride (PVDF) or other organic binder. In addition, the lithium ion battery may contain copper, iron, or the like. Further, the lithium ion battery generally contains an electrolytic solution in the housing. For example, ethylene carbonate, diethyl carbonate or the like may be used as the electrolytic solution.

Examples of lithium carbonate obtained from such lithium ion secondary battery waste are shown below.

(Lithium Dissolution Step)

Figure 4:
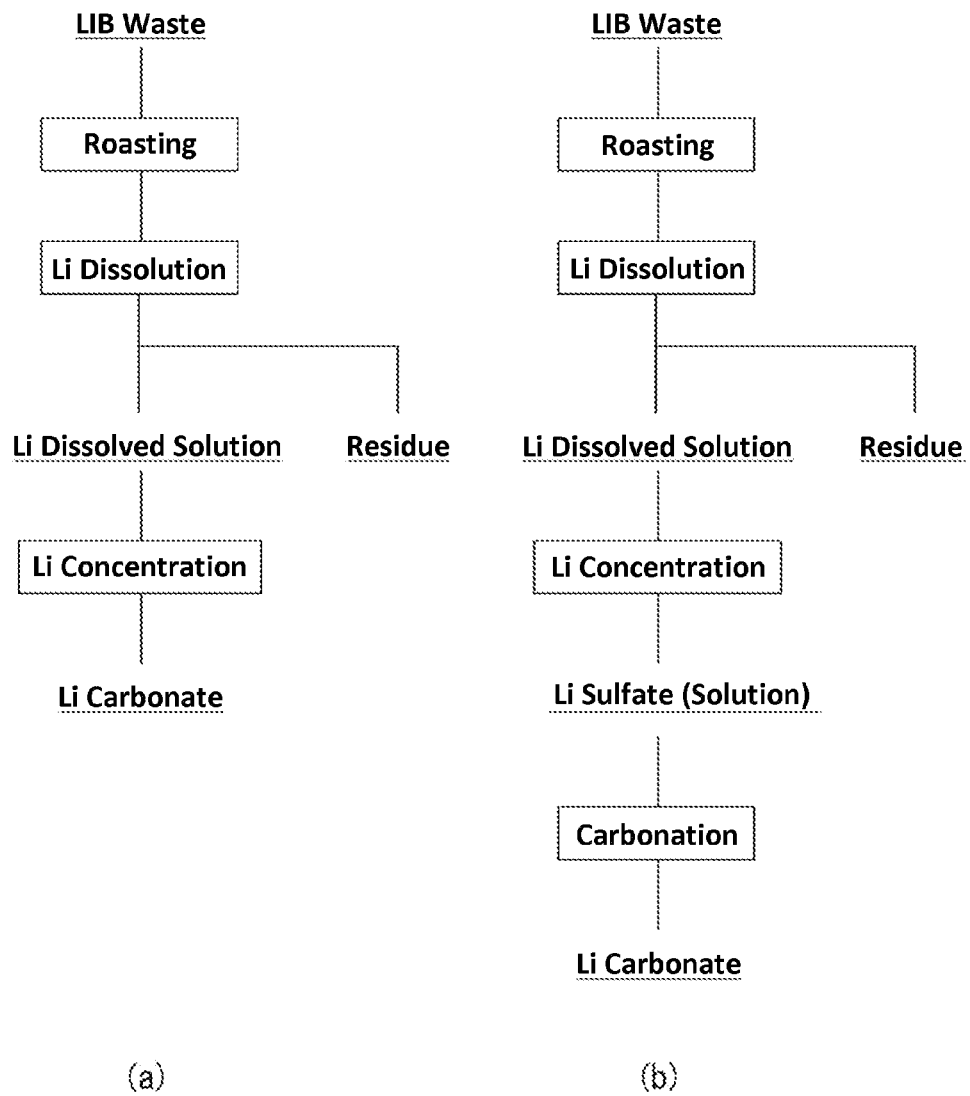
FIG. 4 is a flow chart showing an example of a process for obtaining lithium carbonate that can be used in the method for producing lithium hydroxide of FIG. 3.

As illustrated in FIG. 4, the lithium ion secondary battery waste is processed by roasting, crushing, sieving, and the like as needed, and a lithium dissolution step of dissolving the lithium contained therein in water or an acidic solution is then carried out to obtain a solution containing lithium (which is, hereinafter, referred to as a lithium dissolved solution). In the lithium dissolution step, the solution becomes alkaline as lithium is dissolved, so that the pH may be adjusted as needed such that the final pH of the lithium dissolved solution is 7 to 10. This is because, in this case, the pH of 7 to 10 can suppress the elution of cobalt, nickel, aluminum, and the like, and selectively dissolve mainly lithium.

In the lithium dissolution step, for example, lithium can be dissolved while feeding carbonate ions by blowing a carbon dioxide gas or feeding a carbonate or carbonated water. In this case, a lithium hydrogen carbonate solution is obtained as a lithium dissolved solution, under the reactions of $H_2O+CO_2 \rightarrow H_2CO_3$ and $Li_2CO_3+H_2CO_3 \rightarrow 2\ LiHoCO_3$ for lithium carbonate, the reactions of $2LiOH \rightarrow Li_2O+H_2O$ and $Li_2O+H_2CO_3+CO_2 \rightarrow 2LiHCO_3$, or the reactions of $Li_2O+CO_2 \rightarrow Li_2CO_3$ and $Li_2CO_3+H_2CO_3 \rightarrow 2\ LiHoCO_3$ for lithium hydroxide and lithium oxide. The blowing of the carbon dioxide gas is preferable in that it can suppress the contamination of impurities and suppress an increase in the amount of liquid, thereby preventing dilution of the lithium concentration. Specific examples of the carbonate where the carbonate salt is added include sodium carbonate, and an amount of the carbonate added can be 1.0 to 2.0-fold molar equivalents, and more preferably 1.0 to 1.2-fold molar equivalents.

The lithium dissolved solution obtained by treating the lithium ion secondary battery waste by roasting or the like and then dissolving it in water or an acidic solution contains less impurities and is suitable as a raw material for lithium hydroxide, which will be described below. Further, the residue generated in the lithium dissolution step can be used in the recovery process of valuable metals such as cobalt and nickel by acid leaching, neutralization, solvent extraction, and the like.

Alternatively, the lithium dissolved solution may be a solution in which valuable metals such as cobalt, nickel, and manganese are recovered to leave lithium, while leaching all elements and removing impurities without previously recovering lithium from the sieved material obtained by roasting, crushing, and sieving of the lithium ion battery waste.

(Lithium Concentration Step)

When the lithium dissolved solution is a lithium hydrogen carbonate solution, it can be concentrated by increasing the lithium concentration by heat concentration or the like, as shown in FIG. 4(a). Here, the lithium dissolved solution can be concentrated by heating it to a temperature of, for example, 50° C. to 90° C. This can allow carbonic acid to be released as a carbon dioxide gas from the lithium dissolved solution to provide lithium carbonate. Alternatively, methanol, ethanol, or the like can be added to the lithium dissolved solution to release carbonic acid using such a non-aqueous solvent. Among them, methanol and ethanol are preferably used as the non-aqueous solvent, because they are inexpensive. Here, specific examples of the addition method can include mixing and stirring of the non-aqueous solvent with the lithium dissolved solution.

The lithium carbonate thus obtained can be purified as needed. Specifically, the lithium carbonate is purified by repulp-washing lithium carbonate obtained by release of carbonic acid from the lithium dissolved solution and also blowing a carbon dioxide gas therein to solve carbonic acid in the liquid, and then separating a lithium hydrogen carbonate solution from calcium, magnesium, and the like by solid-liquid separation. Subsequently, decarboxylation and concentration are carried out, and solid-liquid separation is then performed to separate purified lithium carbonate from filtrate. If the impurity content in the purified lithium carbonate is higher, it may be further washed.

Alternatively, as shown in FIG. 4(b), a lithium concentration step may be carried out to extract the lithium ions in the lithium dissolved solution with a solvent and back-extracting the lithium ions in the solvent. The lithium concentration step of extraction and back extraction with the solvent concentrates the lithium ions, yielding, for example, a lithium sulfate solution. In the lithium concentration step, the solvent after extracting the lithium ions may be scrubbed with a lithium solution containing lithium ions. In this case, the scrubbed solvent is subjected to back extraction. The lithium sulfate solution thus obtained can be converted into lithium carbonate by carrying out a carbonation step as described below. The details of the extraction and back extraction are described below.

Specifically, the extraction is carried out, for example, by bringing the lithium dissolved solution (aqueous phase) into contact with the solvent (organic phase), stirring and mixing them in a mixer, and transferring lithium ions and the like in the lithium dissolved solution to the solvent. The organic phase is then separated from the aqueous phase based on a difference in specific gravity using a settler. An O/A ratio, which is a volume ratio of the organic phase to the aqueous phase, can be greater than 1.5/1.0, depending on the lithium ion concentration or other conditions. To increase the extraction rate of the lithium ions, the O/A ratio can be adjusted and the number of extraction stages can be increased.

Here, for the lithium dissolved solution, a phosphonate extracting agent alone, or a phosphate ester extracting agent alone, or a mixed extracting agent of a phosphonate ester extracting agent and a phosphate ester extracting agent can be used as an extracting agent that is the solvent. As the phosphonate extracting agent, 2-ethylhexyl 2-ethylhexylphosphonate (trade name: PC-88A, Ionquest 801) is preferable from the viewpoint of a separation efficiency between nickel and cobalt. Examples of the phosphate extracting agent include di-2-ethylhexyl phosphate (trade name: D2EHPA or DP8R) and the like.

The extracting agent can optionally be diluted with a hydrocarbon organic solvent such as aromatic, paraffinic and naphthenic solvents, before use. In this case, the concentration of the extracting agent can be, for example, 15% to 35% by volume.

The equilibrium pH during extraction is preferably 7 to 8. This is because if the equilibrium pH is less than 7, the lithium extraction rate may be decreased and phase separation may be deteriorated, while if the equilibrium pH is higher than 8, the alkaline concentration derived from a pH adjusting agent may be increased, so that the extracting agent and the diluent may be separated. From this point of view, the equilibrium pH during extraction is more preferably 7.2 to 7.5. The term "equilibrium pH" as used herein refers to the pH of the aqueous phase when the aqueous phase and the oil phase are separated by leaving to stand after the solvent extraction operation, scrubbing operation, and back extraction operation.

The pH adjusting agent such as sodium hydroxide, lithium hydroxide, aqueous ammonia, or other alkaline solutions can be used to adjust the pH during extraction. Among them, sodium hydroxide is preferred because it is inexpensive compared with other reagents and has no odor.

The solvent that has extracted the lithium ions can be scrubbed with the lithium solution. The lithium ion concentration in the lithium solution used for scrubbing is preferably 1.0 g/L to 10.0 g/L, and more preferably 1.0 g/L to 5.0 g/L. During scrubbing, it is preferable to adjust the pH of the mixture of the solvent and the lithium solution to 5.0 to 9.0, and it is further preferable to adjust the pH to 6.0 to 8.0.

The lithium ions contained in the solvent is then back-extracted from the solvent. In the back extraction, for example, a pre-back extraction liquid, which is an acidic aqueous solution, is stirred and mixed with a mixer or the like. This allows the lithium ions contained in the solvent to be transferred to the aqueous phase.

The pre-back extraction solution used for the back extraction may be any inorganic acid such as sulfuric acid, hydrochloric acid, and nitric acid. Among them, sulfuric acid is preferred. This is because, by using sulfuric acid, the back-extracted liquid is converted into a lithium sulfate liquid, which can be used as a raw material for lithium hydroxide.

In the back extraction, the pH is maintained such that the equilibrium pH is preferably in the range of 0.5 to 2.0, and more preferably in the range of 1.0 to 1.5. If the equilibrium pH during back extraction deviates from the range to become lower, an amount of the pH adjusting agent during the extraction may increase. Moreover, if the equilibrium pH exceeds the range to become higher, the lithium ions may remain in the solvent. If the back extraction is carried out in multiple stages, the pH may increase as the number of stages is increased. In this case, it is also preferable to manage the equilibrium pH such that it is maintained in the above range, such as by adding sulfuric acid, for example.

It should be noted that although other conditions are appropriately set, the O/A ratio can be, for example, 1.0 or more, and preferably 1.0 to 1.5.

The back-extracted liquid obtained in the back extraction step can be further subjected to the back extraction step as a pre-back extraction liquid, thereby further increasing the lithium ion concentration. Further, the back-extracted liquid can also be used in the scrubbing step as a lithium solution.

The back-extracted solution (lithium sulfate solution) has a lithium ion concentration of, for example, 10 g/L to 30 g/L, and typically 20 g/L to 25 g/L.

In particular, the lithium ion concentration in the lithium sulfate solution obtained from the lithium ion secondary battery waste as described above is, for example, 10.0 g/L to 30.0 g/L, and typically 20.0 g/L to 25.0 g/L. For example, potassium, calcium, iron, copper, zinc, aluminum, nickel, cobalt, manganese, etc. are maintained in low levels before solvent extraction. On the other hand, impurities such as phosphorus and chlorine are removed prior to solvent extraction, resulting in lower concentrations.

However, it can be applied not only to the process of recovering valuable metals from lithium ion secondary battery waste but also to various processes for obtaining liquid or solid lithium sulfate.

(Carbonation Step)

If by carrying out the extraction and back extraction with the solvent in the lithium concentration step as described above, for example, the lithium concentration is concentrated to be more than or equal to the solubility of lithium carbonate, and the lithium sulfate solution is obtained as shown in FIG. 4 (b), the carbonation step can be carried out.

Here, the lithium ions in the lithium sulfate solution are converted into lithium carbonate by adding a carbonate salt to or blowing a carbon dioxide gas into the lithium sulfate solution. After adding the carbonate or blowing the carbon dioxide gas, for example, the temperature of the liquid is kept in the range of 20° C. to 50° C., stirred as needed, and maintained for a predetermined period of time. Examples of the carbonate include sodium carbonate and ammonium carbonate, but sodium carbonate is preferable from the viewpoint of a recovery rate.

It is preferable that the lithium sulfate solution has a relatively high pH of 10 to 13 during carbonation. If the carbonate is added in a lower pH state, it will escape as a carbon dioxide gas, so that the reaction efficiency may be decreased.

Lithium carbonate is obtained by subjecting the lithium sulfate solution to the carbonation step.

(Hydroxylation Step)

In the hydroxylation step using Ca, the above lithium carbonate is allowed to react with calcium hydroxide in a liquid to obtain a lithium hydroxide solution. The reaction herein can be expressed as: $Li_2CO_3 + Ca(OH)_2 \rightarrow 2LiOH + CaCO_3$. This leads to a lithium hydroxide solution in which lithium hydroxide is dissolved, and calcium carbonate is precipitated. The use of calcium hydroxide in the hydroxylation step is effective in that, for example, lithium sulfate can be converted into lithium carbonate, and the lithium hydroxide solution can be then produced through a chemical conversion reaction with lithium carbonate.

More particularly, for the lithium carbonate solution, calcium hydroxide is added to the lithium carbonate solution and allowed to react in the liquid. Alternatively, for solid lithium carbonate, the lithium carbonate and calcium hydroxide are added to a liquid such as water to form a slurry, and the reaction is caused.

Calcium hydroxide is preferably added in a molar equivalent amount of 1.05 to 1.10 times the amount of lithium hydroxide in the above reaction formula. If the amount of calcium hydroxide added is excessive, the amount of calcium hydroxide that does not contribute to the reaction increases. Calcium hydroxide that does not contribute to the reaction increases the amount of residue during solid-liquid separation and becomes an impurity during crystallization, which may increase the load of the calcium removal step and may increase the total cost.

When allowing lithium carbonate to react with calcium hydroxide, the pH of the liquid may be 9 or higher. Although the upper limit is not specified, the pH of 12 or less is preferable because if the pH is more than 12, it merely becomes excessive. A lower pH may result in insufficient reaction from lithium carbonate to lithium hydroxide, while a higher pH may result in excessive calcium hydroxide, and may take chemical costs, and removal costs.

Most of the calcium carbonate produced in the above reaction can be removed by solid-liquid separation using a thickener, filter press, or the like after the reaction. In other words, most of the calcium carbonate can be separated from the lithium hydroxide solution by solid-liquid separation after the reaction.

However, even if the solid-liquid separation is carried out, calcium may remain dissolved in the lithium hydroxide solution. The calcium ions contained in the lithium hydroxide solution decreases the purity of lithium hydroxide after crystallization. Therefore, in this embodiment, the calcium ions are removed by carrying out a calcium removal step as described below.

(Calcium Removal Step)

In the calcium removal step, to remove the calcium ions in the lithium hydroxide solution obtained in the above hydroxylation step, the lithium hydroxide solution is brought into contact with a cation exchange resin and/or a chelate resin to remove the impurities. More particularly, the lithium hydroxide solution is passed through the resin. As a result, the calcium ions that may be contained in the lithium hydroxide solution are adsorbed to the resin, so that calcium can be removed from the lithium hydroxide solution. Consequently, high-purity lithium hydroxide can be obtained after a crystallization step as described later.

Here, it is important to select the resin and conditions in the calcium removal step so that the calcium ions in the lithium hydroxide solution are efficiently removed.

The resin for removing the calcium ions and the like is at least one of the cation exchange resin and the chelate resin. The lithium hydroxide solution may be brought into contact with one of the cation exchange resin or the chelate resin, and then brought into contact with the other. In other words, the resin adsorption process may be carried out in multiple stages.

The cation exchange resin is a synthetic resin that binds cations by having acidic groups on its surface. The chelating resin is a resin having functional groups that form complexes with metal ions. Since the lithium hydroxide solution contains lithium ions and the like in addition to the calcium ions, it is desirable to use a cation exchange resin and/or a chelate resin having a higher difference in selectivity for the lithium ions in the impurity removal step.

When the cation exchange resin is used, it is preferable to use a weakly acidic cation exchange resin having carboxyl group as functional group. Strongly acidic cation exchange resins have a small difference in selectivity between monovalent metals and divalent metals, so that there is a risk that the divalent metals may leak at a relatively early stage of liquid passage. On the other hand, the weakly acidic cation exchange resin adsorbs a metal so as to sandwich it between two carboxyl groups, so that it has high selectivity for divalent metals. In particular, a weakly acidic cation exchange resin having a high ion exchange capacity and excellent physical strength is suitable.

The chelate resin has higher selectivity for specific metals due to the chelate effect of ion exchange and coordination bonding of functional groups. In particular, the chelate resin can be effectively used in the lithium hydroxide solution in which lithium ions and the like coexist. The chelating resin includes types of iminodiacetic acid and aminophosphoric acid. Among them, the aminophosphoric acid type chelating resin is preferable in that it has higher selectivity of calcium or the like for monovalent ions than other chelate resins.

When the cation exchange resin or the chelate resin is packed in a column and the lithium hydroxide solution is passed through the column, a space velocity (SV) in the column is preferably in the range of 5 to 20. The space velocity (SV) means a ratio (multiples) of the passed amount of the lithium hydroxide solution per hour to the cation exchange resin or chelate resin packed in the column. In general, if the space velocity (SV) is too high, there is a concern that the calcium ions in the lithium hydroxide solution may not be sufficiently removed due to insufficient adsorption time of the calcium ions to the resin. If the space velocity (SV) is too slow, the processing speed will decrease and the processing time will increase.

When the lithium hydroxide solution is brought into contact with the cation exchange resin and/or the chelate resin, it is preferable that the pH of the lithium hydroxide solution is 9 or higher, that is, the lithium hydroxide solution is alkaline. This is because when the pH of the lithium hydroxide solution is less than 9, the efficiency of removing the calcium ions may decrease, or even lithium ions may be adsorbed, depending on the resin used herein. The pH of the lithium hydroxide solution to be brought into contact with the resin may be changed depending on the type of the resin selected.

(Crystallization Step)

In the crystallization step, lithium hydroxide is precipitated in the lithium hydroxide solution from which impurities have been removed in the above calcium removal step. This can provide lithium hydroxide.

In the crystallization step, a crystallization operation such as heating concentration or vacuum distillation can be carried out in order to precipitate lithium hydroxide. In the case of heating concentration, a higher temperature during crystallization will lead to faster processing, which is preferable. However, after crystallization, it is preferable to dry the crystallized product at a temperature of less than 60° C. at which water of crystallization is not released. This is because the release of the water of crystallization results in anhydrous lithium hydroxide, which is deliquescent and difficult to be handled.

Subsequently, a pulverization process or the like can be carried out in order to adjust the above lithium hydroxide to required physical properties.

The lithium hydroxide thus obtained has a calcium content sufficiently reduced to, for example, 10 ppm by mass or less, due to the calcium removal step. Such high-purity lithium hydroxide is suitable for use as a raw material for producing lithium ion secondary batteries.

EXAMPLES

Next, the methods for lithium hydroxide as described above were experimentally carried out and the effects thereof were confirmed, as described below. However, the descriptions herein are merely for illustrative and are not intended to be limited.

Test Example 1-1

After adding 250 g of lithium sulfate and 648 g of barium hydroxide to 5000 mL of water, solid-liquid separation was carried out by filtration to obtain a lithium hydroxide solution. The Li concentration in the lithium hydroxide solution was 6.0 g/L, the Ba concentration was 1.3 g, and the pH was 12.

In Example 1, the lithium hydroxide solution obtained as described above was passed at room temperature through a column filled with 20 mL of a cation exchange resin having carboxyl groups (AMBERLITE IRC76 from ORGANO CORPORATION) to remove impurities. The lithium hydroxide solution had a pH of 12 and a space velocity (SV) of 9 during the liquid passage.

In Example 2, the above lithium hydroxide solution was passed at room temperature through a column filled with 20 mL of a chelate resin (AMBERLITE IRC747UPS ORGANO CORPORATION) to remove impurities. The lithium hydroxide solution had a pH of 12 and a space velocity (SV) of 9 during the liquid passage.

In Comparative Example 1, the above lithium hydroxide solution was not subjected to the resin adsorption.

Subsequently, for all of Examples 1 and 2 and Comparative Example 1, the lithium hydroxide solution was heated and concentrated at a temperature of 50° C. to crystallize lithium hydroxide.

Table 1 shows the impurity contents of the lithium hydroxides obtained in Examples 1 and 2 and Comparative Example 1 as described above.

TABLE 1

| (ppm) | Na | K | Ca | Mg | Cr | Fe | Cu | Zn | Pb | S | Al | Cl | F | Ba |
|---|---|---|---|---|---|---|---|---|---|---|---|---|---|---|
| Example 1 (Cation Exchange Resin) | <50 | <50 | <10 | <10 | <10 | <10 | <10 | <10 | <10 | <10 | <10 | <10 | <10 | <10 |
| Example 2 (Chelate Resin) | <50 | <50 | <10 | <10 | <10 | <10 | <10 | <10 | <10 | <10 | <10 | <10 | <10 | <10 |
| Comparative Example 1 (No Resin Adsorption) | <50 | <50 | <10 | <10 | <10 | <10 | <10 | <10 | <10 | <10 | <10 | <10 | — | 15,000 |

As can be seen from Table 1, in each of Examples 1 and 2, the Ba content in lithium hydroxide was sufficiently reduced as compared with Comparative Example 1. Therefore, it is found that the lithium ions were effectively removed by the treatment with the cation exchange resin or the chelate resin.

Test Example 1-2

For each of the cation exchange resin used in Example 1 and the chelate resin used in Example 2, changes in the Li concentration and Ba concentration in the lithium hydroxide solution after passing through the resin were confirmed when changing the BV (Bed Volume) which was multiples of the flow rate of liquid passage with respect to the resin amount. The BV is represented by: BV=liquid amount passed (L)/resin volume (L). Here, the same lithium hydroxide solution as that in Test Example 1-1 was used. The results are graphically shown in FIG. 5.

Figure 5:
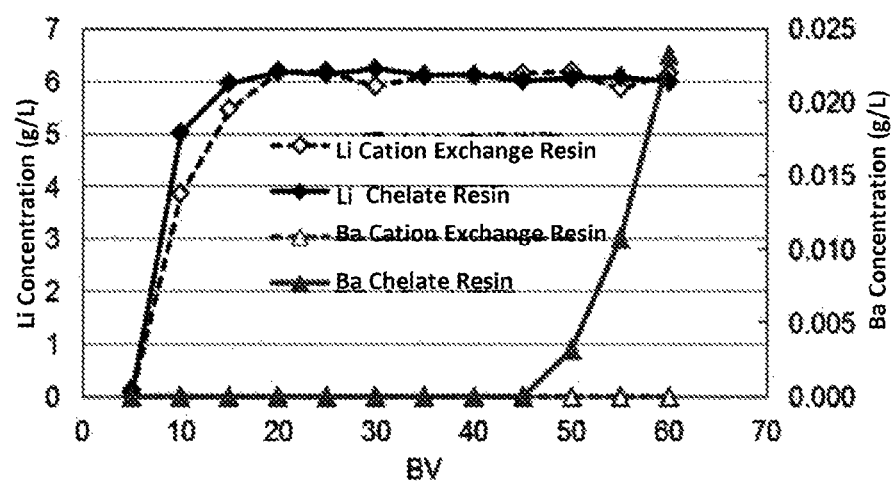
FIG. 5 is a graph showing a relationship between BV (Bed Volume) and a lithium concentration and barium concentration in a lithium hydroxide solution after passing through a resin in Test Example 1-2.

It was found from FIG. 5 that a higher Li concentration and a lower Ba concentration were maintained in the lithium hydroxide solution after liquid passage over a relatively wide range of BV. Therefore, according to this, it was found that it could contribute to the production of relatively high-purity lithium hydroxide from lithium sulfate.

Test Example 1-3

Lithium in roasted lithium ion secondary battery waste was dissolved in water or an acidic solution, lithium ions were extracted from the resulting lithium dissolved solution with a solvent, and the solvent after extraction was scrubbed with a lithium solution, and lithium ions were back-extracted from the scrubbed solvent, thereby obtaining a lithium sulfate solution as a back extracted liquid. Table 2 shows the impurity composition of the back-extracted liquid.

TABLE 2

| (mg/L) | Na | K | Ca | Mg | Cr | Fe | Cu |
|---|---|---|---|---|---|---|---|
| Back-Extracted Liquid | <10 | <10 | <10 | <10 | <10 | <10 | <10 |
| (mg/L) | Zn | Si | Al | Cl | Mi | Co | Mn |
| Back-Extracted Liquid | <10 | <10 | <10 | <10 | <10 | <10 | <10 |

Barium hydroxide was added to the lithium sulfate solution as described above, and solid-liquid separation was then carried out by filtration to obtain a lithium hydroxide solution. Using each of the cation exchange resin used in Example 1 and the chelate resin used in Example 2, the lithium hydroxide solution after passing through the resin was heated and concentrated at a temperature of 50° C. to crystallize lithium hydroxide.

As a result, lithium hydroxide having high purity at the same level as that of each of Examples 1 and 2 in Table 1 was obtained.

Test Example 1-4

A test was conducted to confirm a difference between the reaction efficiencies of the case where lithium sulfate and barium hydroxide were used as solids and the case where they were used as solutions in the hydroxylation step.

In Example 3, solid lithium sulfate and solid barium hydroxide were added to pure water and allowed to react with each other. More particularly, 419 g (1.7 equivalents) and 493 g (2.0 equivalents) of solid barium hydroxide were prepared for 100 g of solid lithium sulfate. Lithium sulfate and each barium hydroxide as described above was added to 500 mL of pure water, and stirred and maintained at 60° C. for 24 hours, followed by solid-liquid separation to recover a lithium hydroxide solution.

In Example 4, both lithium sulfate and barium hydroxide were mixed as solutions and allowed to react with each other, and the lithium hydroxide solution was then recovered. More particularly, 200 mL of a solution obtained by dissolving 50 g of lithium sulfate in pure water at 60° C., and 800 mL of a solution obtained by dissolving each of 123 g (1.0 equivalent), 130 g (1.05 equivalents) and 136 g (1.1 equivalents) of barium hydroxide in pure water at 60° C., were mixed together, stirred and maintained at 60° C. for 24 hours, and solid-liquid separation was then carried out to obtain a lithium hydroxide solution.

Table 3 shows the grade of lithium hydroxide produced by changing the amount of barium hydroxide as in Examples 3 and 4 and crystallizing each lithium hydroxide solution obtained by distillation under reduced pressure. For lithium sulfate and barium hydroxide, special grade reagents from Wako were used.

TABLE 3

| (ppm) | | S | Ba |
|---|---|---|---|
| (Solid-Solid) Example 3 | 1.7 eq. | 14,000 | 56 |
| | 2.0 eq. | <10 | 15,000 |
| (Liquid-Liquid) Example 4 | 1.0 eq. | 1,500 | <10 |
| | 1.05 eq. | <10 | 2,100 |
| | 1.1 eq. | <10 | 13,000 |

Table 3 shows the values of sulfur and barium as impurity grades in the lithium hydroxide obtained by crystallization, and S is derived from unreacted lithium sulfate, and Ba is derived from unreacted barium hydroxide.

When the solids reacted with each other, the grades of sulfur and barium changed between 1.7 and 2.0 equivalents, so it was found that the total amount of lithium sulfate reacted in the same range. On the other hand, when the liquids reacted with each other, it was found that the total amount of lithium sulfate reacted between 1.0 and 1.05 equivalents, and that the reaction efficiency could be improved by adding barium hydroxide as a solution.

Test Example 2-1

After adding 250 g of lithium carbonate and 648 g of calcium hydroxide to 5000 mL of water, solid-liquid separation was carried out by filtration to obtain a lithium hydroxide solution. The Li concentration in the lithium hydroxide solution was 6.0 g/L, the Ca concentration was 0.03 g/L, and the pH was 12.

In Example 1, the lithium hydroxide solution obtained as described above was passed at room temperature through a column filled with 20 mL of a cation exchange resin having carboxyl groups (AMBERLITE IRC76 from ORGANO CORPORATION) to remove impurities. The lithium hydroxide solution had a pH of 12 and a space velocity (SV) of 9 during the liquid passage.

In Example 2, the above lithium hydroxide solution was passed at room temperature through a column filled with 20 mL of a chelate resin (AMBERLITE IRC747UPS from ORGANO CORPORATION) to remove impurities. The lithium hydroxide solution had a pH of 12 and a space velocity (SV) of 9 during the liquid passage.

In Comparative Example 1, the above lithium hydroxide solution was not subjected to the resin adsorption.

Subsequently, for each of Examples 1 and 2 and Comparative Example 1, the lithium hydroxide solution was heated and concentrated at a temperature of 50° C. to crystallize lithium hydroxide.

Table 1 shows the impurity content of the lithium hydroxide obtained in each of Examples 1 and 2 and Comparative Example 1 as described above.

passed (L)/resin volume (L). Here, the same lithium hydroxide solution as that in Test Example 2-1 was used. The results are graphically shown in FIG. 7.

Figure 7:
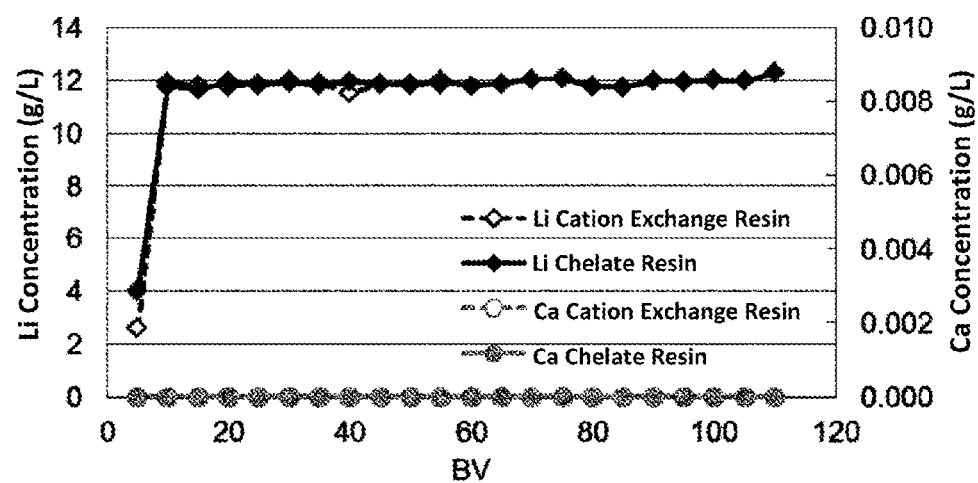
FIG. 7 is a graph showing the relationship between BV (Bed Volume) and a lithium concentration and calcium concentration in a lithium hydroxide solution after passing through a resin in Test Example 2-2.

It was found from FIG. 7 that a higher Li concentration and a lower Ca concentration were maintained in the lithium hydroxide solution after liquid passage over a relatively wide range of BV. Therefore, according to this, it was found that it could contribute to the production of relatively high-purity lithium hydroxide from lithium sulfate.

Test Example 2-3

Lithium in roasted lithium ion secondary battery waste was dissolved in water or an acidic solution, lithium ions were extracted from the resulting lithium dissolved solution with a solvent, and the solvent after extraction was scrubbed with a lithium solution, and lithium ions were back-extracted from the scrubbed solvent, thereby obtaining a lithium sulfate solution as a back-extracted liquid. Table 2 shows the impurity composition of the back-extracted liquid.

TABLE 5

| (mg/L) | Na | K | Ca | Mg | Cr | Fe | Cu |
|---|---|---|---|---|---|---|---|
| Back-Extracted Liquid | <10 | <10 | <10 | <10 | <10 | <10 | <10 |
| (mg/L) | Zn | Si | Al | Cl | Mi | Co | Mn |
| Back-Extracted Liquid | <10 | <10 | <10 | <10 | <10 | <10 | <10 |

The carbonation was carried out by adding sodium carbonate to the lithium sulfate solution as described above, and

TABLE 4

| (ppm) | Na | K | Ca | Mg | Cr | Fe | Cu | Zn | Pb | S | Al |
|---|---|---|---|---|---|---|---|---|---|---|---|
| Example 1 (Cation Exchange Resin) | <50 | <50 | <10 | <10 | <10 | <10 | <10 | <10 | <10 | <50 | <10 |
| Example 2 (Chelate Resin) | <50 | <50 | <10 | <10 | <10 | <10 | <10 | <10 | <10 | <50 | <10 |
| Comparative Example 1 (No Resin Adsorption) | <50 | <50 | 380 | <10 | <10 | <10 | <10 | <10 | <10 | <50 | <10 |

| (ppm) | Cl | F | Ba | Zn | Pb | S | Al | Cl | F | Ba |
|---|---|---|---|---|---|---|---|---|---|---|
| Example 1 (Cation Exchange Resin) | <10 | <50 | — | <10 | <10 | <50 | <10 | <10 | <50 | — |
| Example 2 (Chelate Resin) | <10 | <50 | — | <10 | <10 | <50 | <10 | <10 | <50 | — |
| Comparative Example 1 (No Resin Adsorption) | <10 | — | — | <10 | <10 | <50 | <10 | <10 | — | — |

As can be seen from Table 4, in each of Examples 1 and 2, the Ca content in lithium hydroxide was sufficiently reduced as compared with Comparative Example 1. Therefore, it is found that the calcium ions were effectively removed by the treatment with the cation exchange resin or the chelate resin.

Test Example 2-2

For each of the cation exchange resin used in Example 1 and the chelate resin used in Example 2, changes in the Li concentration and Ca concentration in the lithium hydroxide solution after passing through the resin were confirmed when changing the BV (Bed Volume) which was multiples of the flow rate of liquid passage with respect to the resin amount. The BV is represented by: BV=amount of liquid solid-liquid separation was then carried out by filtration to obtain a lithium hydroxide solution. Using each of the cation exchange resin used in Example 1 and the chelate resin used in Example 2, the lithium hydroxide solution after passing through the resin was heated and concentrated at a temperature of 50° C. to crystallize lithium hydroxide.

As a result, lithium hydroxide having high purity at the same level as that of each of Examples 1 and 2 in Table 4 was obtained.

The invention claimed is:
1. A method for producing lithium hydroxide from lithium sulfate, the method comprising:
    a hydroxylation step of allowing the lithium sulfate to react with barium hydroxide in a liquid to provide a lithium hydroxide solution; a barium removal step of removing barium ions in the lithium hydroxide solution using a cation exchange resin and/or a chelate resin; and a crystallization step of precipitating lithium hydroxide in the lithium hydroxide solution that has undergone the barium removal step.

2. The method for producing lithium hydroxide according to claim 1, wherein, in the barium removal step, the lithium hydroxide solution has a pH of 9 or more when the lithium hydroxide solution is brought into contact with the cation exchange resin and/or the chelate resin.

3. The method for producing lithium hydroxide according to claim 1, wherein, in the barium removal step, the lithium hydroxide solution has a space velocity (SV) of 5 to 20 when the lithium hydroxide solution is passed through the cation exchange resin and/or the chelate resin.

4. The method for producing lithium hydroxide according to claim 1, wherein a weakly acidic cation exchange resin having carboxyl groups as functional groups is used in the barium removal step.

5. The method for producing lithium hydroxide according to claim 1,
wherein the lithium sulfate is in a form of a lithium sulfate solution; and
wherein the lithium sulfate solution is obtained by a process comprising: a lithium dissolution step of dissolving lithium in roasted lithium ion secondary battery waste in water or an acidic solution to obtain a lithium dissolved solution; and a lithium concentration step of extracting lithium ions from the lithium dissolved solution with a solvent and back-extracting the lithium ions.

6. The method for producing lithium hydroxide according to claim 5, wherein, in the lithium concentration step, lithium is extracted into a solvent, the solvent is then scrubbed with a lithium solution, and lithium ions are back-extracted from the scrubbed solvent.

7. The method for producing lithium hydroxide according to claim 1, wherein the method produces lithium hydroxide used for producing lithium ion secondary batteries.

8. The method for producing lithium hydroxide according to claim 1, wherein, in the hydroxylating step, the barium hydroxide is in a form of a barium hydroxide solution, and the barium hydroxide solution is brought into contact with the lithium sulfate.

9. The method for producing lithium hydroxide according to claim 8, wherein the barium hydroxide solution is a saturated aqueous solution.

10. The method for producing lithium hydroxide according to claim 8, wherein, in the hydroxylating step, the barium hydroxide solution is brought into contact with the lithium sulfate at a liquid temperature of 40° C. to 100° C.

11. A method for producing lithium hydroxide from lithium carbonate, the method comprising:
a hydroxylation step of allowing the lithium carbonate to react with calcium hydroxide in a liquid to provide a lithium hydroxide solution; a calcium removal step of removing calcium ions in the lithium hydroxide solution using a cation exchange resin and/or a chelate resin; and a crystallization step of precipitating lithium hydroxide in the lithium hydroxide solution that has undergone the calcium removal step.

12. The method for producing lithium hydroxide according to claim 11, wherein, in the calcium removal step, the lithium hydroxide solution has a pH of 9 or more when the lithium hydroxide solution is brought into contact with the cation exchange resin and/or the chelate resin.

13. The method for producing lithium hydroxide according to claim 11, wherein, in the calcium removal step, the lithium hydroxide solution has a space velocity (SV) of 5 to 20 when the lithium hydroxide solution is passed through the cation exchange resin and/or the chelate resin.

14. The method for producing lithium hydroxide according to claim 11, wherein a weakly acidic cation exchange resin having carboxyl groups as functional groups is used in the calcium removal step.

15. The method for producing lithium hydroxide according to claim 11, wherein the lithium carbonate is obtained by a process comprising: a lithium dissolution step of dissolving lithium in roasted lithium ion secondary battery waste in water or an acidic solution to obtain a lithium dissolved solution; and a lithium concentration step of concentrating lithium ions in the lithium dissolved solution.

16. The method for producing lithium hydroxide according to claim 11, wherein the method produces lithium hydroxide used for producing lithium ion secondary batteries.

* * * * *